Sept. 11, 1956     C. R. ANDERSON     2,762,255

INTERMITTENT STRIP FEEDING AND CONTROL MECHANISM

Filed Nov. 8, 1955     3 Sheets-Sheet 1

INVENTOR.
CLARENCE RUSSELL ANDERSON
BY
Frank N. Harmon
ATTORNEY

Sept. 11, 1956     C. R. ANDERSON     2,762,255
INTERMITTENT STRIP FEEDING AND CONTROL MECHANISM
Filed Nov. 8, 1955     3 Sheets-Sheet 2
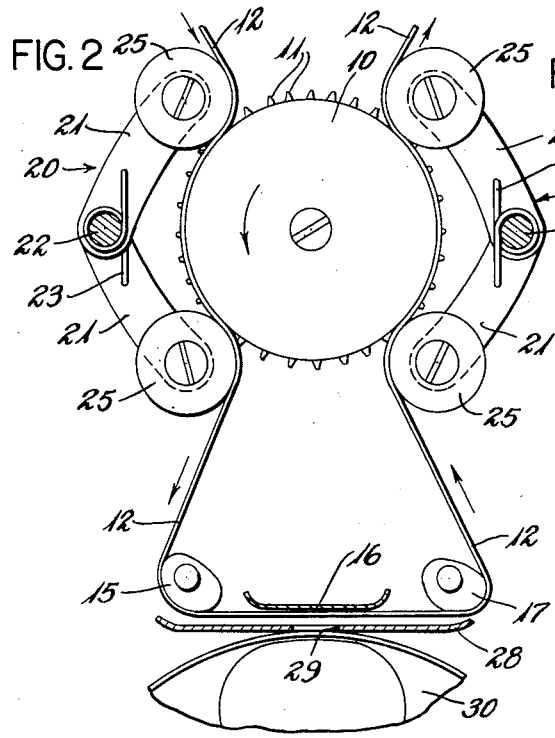
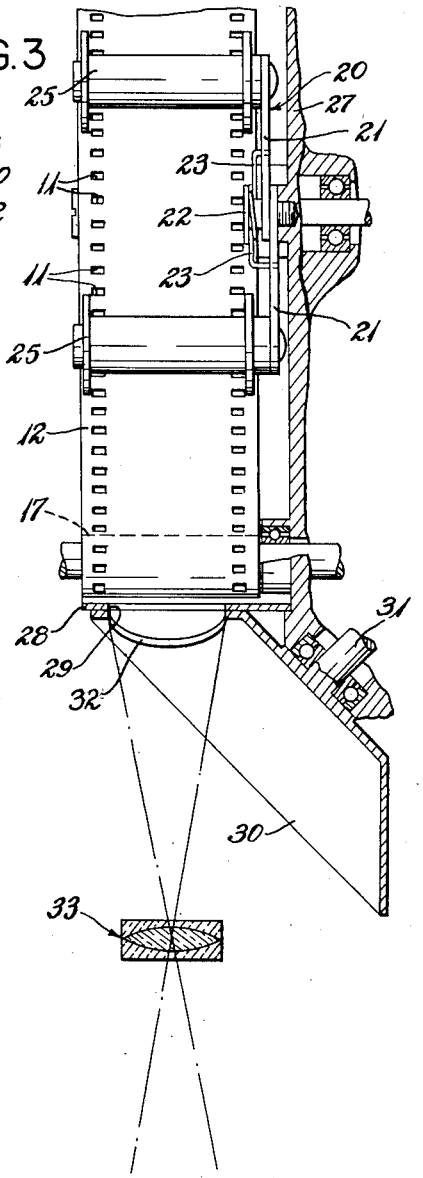
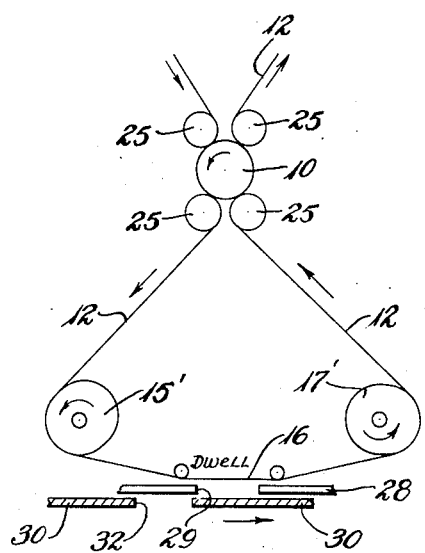
INVENTOR.
CLARENCE RUSSELL ANDERSON
BY
Frank H. Harmon
ATTORNEY Sept. 11, 1956  C. R. ANDERSON  2,762,255
INTERMITTENT STRIP FEEDING AND CONTROL MECHANISM
Filed Nov. 8, 1955  3 Sheets-Sheet 3

INVENTOR.
CLARENCE RUSSELL ANDERSON
BY
Frank H. Harmon
ATTORNEY

United States Patent Office 2,762,255
Patented Sept. 11, 1956

2,762,255

INTERMITTENT STRIP FEEDING AND CONTROL MECHANISM

Clarence Russell Anderson, Solana Beach, Calif., assignor to Bill Jack Scientific Instrument Co., Solana Beach, Calif., a corporation of California Application November 8, 1955, Serial No. 545,773

8 Claims. (Cl. 88—18)

This invention relates to a control mechanism for intermittently advancing predetermined lengths of a strip, such as wire, thread, tape, paper, photographic film and the like, and for interrupting the advance of the strip for a predetermined time interval without interrupting the operation of the positive strip driving mechanism or its driving force on the strip, and is a continuation-in-part of my co-pending application, Serial No. 349,741, for Intermittent Motion Film Transport, filed April 20, 1953, now abandoned.

Whereas the particular control mechanism hereinafter described and claimed can be used in essentially any system where any intermittent strip feed is required, it finds a particular advantage in high speed photography.

In any intermittent film feed control mechanism in photography, or projection, it is essential to interrupt the actual linear advance of the film across the platen area momentarily while the shutter is being opened to expose the portion of the film that is over the platen area and then to index, or advance the film to the next frame in a matter of milliseconds.

It is one of the primary objects of my invention to provide an intermittent strip advancing control mechanism for providing an indexing period and a stationary dwell period for the strip in each cycle of operation and in which the only mass that experiences acceleration is that small weight of the strip itself between the strip engaging members of the control mechanism.

I am well aware of the fact that certain approaches have been made in the photographic and projection art to provide a continuous drive for the film and to employ a control mechanism for providing a cycle of operation in which there is present a film advancing period and a film dwell period in which latter the film remains stationary over the platen area.

One of such approaches, which is exemplified by the U. S. patent to Clapp, 2,409,834, of October 22, 1946, is the employ only one cam on one side of the platen area and loop formers in the form of separate levers having separate cam riders. Such an arrangement invariably results in high inertia forces on the levers that would be intolerable in high speed operating devices such as high speed cameras. The same is true of the U. S. patent to Akers, 2,577,175, of December 4, 1951.

Another conventional approach is found in the U. S. patent to Duhem, 1,039,501, of September 24, 1912, which discloses a moving picture camera in which are employed sprockets whose outer surfaces are circular, one sprocket being mounted on each side of the platen area. Despite the fact that the circular sprockets are eccentrically mounted, or are so mounted that the sprocket axes shift to describe an orbit, the fact remains that the surface of the sprockets that engage the film is in itself circular. I appreciate the fact that such an arrangement does enable a cycle including a film advancing period and also a film dwell period, during which latter the actual advance of film over the platen area is interrupted. However, this dwell period, during which the linear advance of the film over the platen area is interrupted, is a spot dwell and is merely instantaneous and not for a sufficiently long time interval to be of any material utility as an appreciable dwell period needed in high speed photography operatiions.

It frequently becomes desirable to photograph relatively rapid moving mechanical objects with the use of high speed photography in order to obtain proper analysis. Intermittent motion film indexing systems, as heretofore known in the art, are designed to stop the film at the time the shutter mechanism is open. In the event the object being photographed is moving rapidly a blurred picture will in all probability result.

It is therefore a further object of my invention to provide a simplified film indexing mechanism embodying a continuous drive and intermittent transport, but having no loose film loop interposed and to thereby apply a more uniform stress to the film.

A further object of my invention is to provide a film indexing mechanism designed to be used in high speed photography which can pass film across the framing plate opening at a velocity commensurate with the velocity of a moving image point and to index to the succeeding frame at an exceedingly high rate of speed.

More specifically, it is an object of my invention to provide a strip advancing means in the form of a continuous drive in the form of a strip driving member for pulling film from a film supply spool and for delivering the strip to a take-up spool and to provide a pair of non-circular control cams, one located on each side of the platen area and mounted on parallel non-shifting axes, so that the non-circular surfaces of the cams engage the strip in such a manner that, despite the continuous drive of the strip driving members, each cycle of operation representing a full joint rotation of both cams will include a strip advancing period and a maximum prolonged dwell period, during which latter there is no linear advance of the strip between the two cams, or if desired a controlled advance as previously referenced.

I have discovered that such a cam control mechanism should preferably include cams whose axes are non-shifting during their actual rotational operation. I have also discovered that the cams, in order to effect the desired result, can be so shaped that their basic pickup rate is less than the film feed velocity. The cams may also be so shaped as to obtain any desired velocity distribution or acceleration characteristics. In such an organization, the cams may be symmetrical and in various contours, such as elliptical, and produce an appreciable film dwell period of advance between the cams, as distinguished from the circular rollers whose axes shift to describe an orbit, as shown in the aforementioned Duhem patent. I have also discovered that the use of specially generated asymmetric cams makes it possible to obtain an even greater dwell period of advance of the strip between the cams, which, in photographic apparatus, would be in the platen area.

With the foregoing and other objects in view, the invention resides in the combination of parts and in the details of construction hereinafter set forth in the following specification and appended claims, certain embodiments thereof being illustrated in the accompanying drawings, in which:

Figure 2 is a view in partial front elevation of the same;

Figure 3 is a view in partial side elevation of the same;

Figure 4:
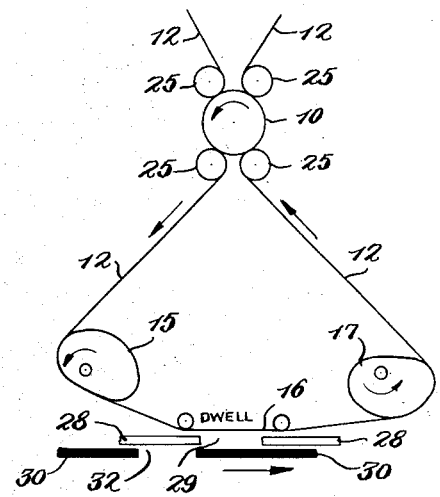
Figure 5:
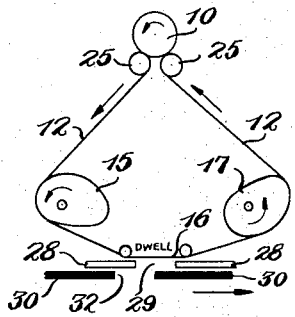
Figure 9:
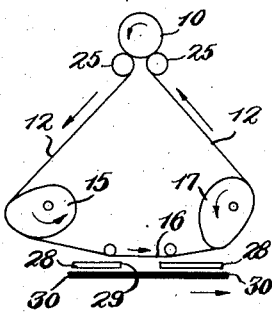
Figure 10:
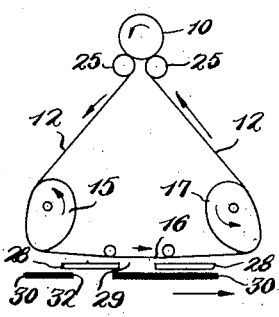

Figures 4 to 8, inclusive, diagrammatically illustrate the correlated steps of operation of the cams, the film therebetween in the platen area, and the shutter during the film exposure operation and the dwell period of the film, the cams being shown as asymmetric;

Figure 9 is a similar view, showing the beginning of the film indexing cycle;

Figure 10 shows the end of the film indexing cycle preparatory to the beginning of the succeeding dwell period; and Figure 11 is a diagrammatical view, similar to Figure 4, of the film advancing means employing symmetrical elliptical cams.

Figure 1:
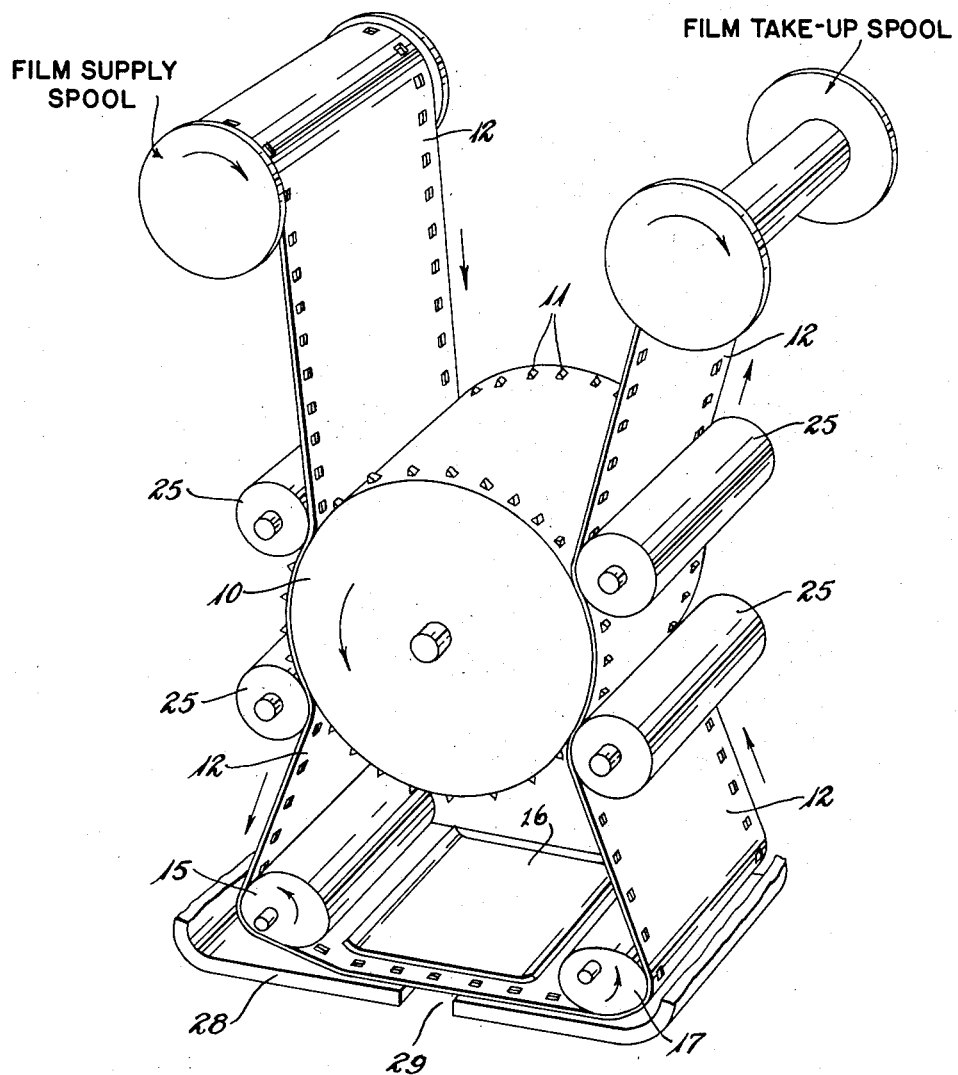
Figure 1 is a view in perspective of the film feeding and cam control mechanism of a photographic apparatus.

Referring to the drawing in greater detail, in Figures 1, 2 and 3, I have illustrated, as an example of an environment in which my invention is particularly suitable, a portion of a high speed camera having a driving drum 10 having teeth 11 to engage a perforated film 12 to drive the film.

The film 12 is fed from a film supply spool into the system around the drum 10, around a cam 15, past a platen 16, around a cam 17, back to the driving drum 10 and onto the film take-up spool.

The film 12 may be held in positive engagement against the drum 10 by means of oppositely disposed pairs of idling roller assemblies designated generally 20. Each of said assemblies is provided with a pair of arms 21 pivotally mounted on a shaft 22 and biased against the drum 10 by means of a spring 23, as shown in Figures 2 and 3.

Each of the arms 21 is also provided with an idling roller 25 at the outer end thereof which rides against the film 12 to hold it in positive engagement with the drum 10.

Whereas the drum 10 is illustrated as having teeth 11, such teeth are not necessary in the event that non-perforated film is used, because of the positive pressure provided by the rollers 25.

It will be understood that the drum 10 and the cams 15 and 17 are preferably connected by means of a positive gear drive to a common source of power so that no differential in the desired rates of rotation between the respective members can occur.

The drum 10 and cams 15 and 17 are supported upon any suitable frame member such as 27. A format plate 28 is also secured to the housing 27 and is positioned immediately adjacent to the film 12 as it passes the platen 16. The format plate 28 is formed with an aperture 29 which determines the size of the picture being taken.

Positioned immediately below the format plate 28 is a rotating conical-shaped shutter 30, rotatably supported on the housing 27 by means of a shaft 31. The shutter 30 is formed with one or more apertures 32 adapted to permit the passage of light intermittently to correspond with the intermittent motion of the film 12. A suitable lens system such as 33 is provided to focus the image through the aperture 32 of the shutter device, the aperture 29 of the format plate 28, and onto the film.

In Figures 1 to 10, inclusive, I have shown one form that my control cams of the preferred non-circular asymmetric type may take, and in Figure 11 I have shown one form, namely, elliptical, that my control cams of non-circular symmetrical type may take.

In Figures 4 to 10, inclusive, I have further illustrated schmetically the sequence of operation of one form that my invention may take, employing non-circular asymmetric control cams, wherein it is adapted to form a means of feeding photographic film in a camera and wherein the cams engage a film loop in partial surface engagement between two spaced points of engagement of the film by the film driving sprocket.

The two cams are specially designed and so generated that with the necessary idlers, and two asymmetric and specially shaped cams at either side of the platen, the film can flow from the supply spool around one side of the sprocket and around an idler to one cam on one side of the platen area. This flow around the sprocket can be maintained at a continuous uniform rate. Likewise, the flow from the opposite cam on the opposite side of the platen area and around the sprocket can be maintained constant to the take-up spool. If the cams were immovable, this flow would result in equivalent film velocity in the platen area and a taut loop of constant length would be maintained around the cams and platen idlers. If, however, the cams are geared together and geared to the sprocket in proper ratio this constant velocity condition at the platen can be altered, as previously described.

This particular asymmetric shape of the cams is so generated that as the cams rotate through a predetermined portion of a revolution they effectively maintain a constant loop tautness, and, at the same time, subtract a portion, or all of the velocity from the film lying between them in the platen area. In considering this effect, starting in sequence at Figure 4 of the drawings, the cam to the left of the platen area contains a film wrap of the shortest possible length, while the cam to the right of the platen area contains a wrap of the longest possible length. As these two cams rotate through a portion of a revolution the condition will be reversed, that is, the maximum length will be on the left hand cam and the minimum length on the right, as shown in Figure 9.

Figures 4 to 8, inclusive, show the sequence of operation, or the period of transition between these two conditions and show that during this period the film is in a dwell, or retarded velocity status in the platen area. True dwell is accomplished by designing the cams, and their geared relationship to the film driving sprocket, so that the left cam 15 accumulates film, or lengthens the film path around it, at the same rate supplied by the constant velocity sprocket 10, while the cam 17 on the right side releases its accumulated film to the sprocket 10 at the required rate. Since the cams 15 and 17 are accommodating all the film 12 supplied by and demanded by the supply and take-up sides of the sprocket 10, and since the film is free to slip on the highly polished cams 15 and 17, there are no forces acting to move the film in the platen area and therefore the film remains still, insofar as its linear advance is concerned.

Figure 6:
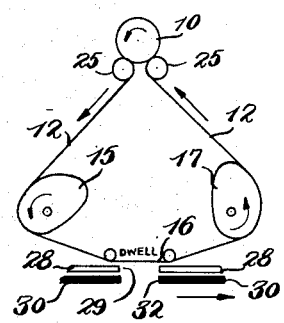
Figure 7:
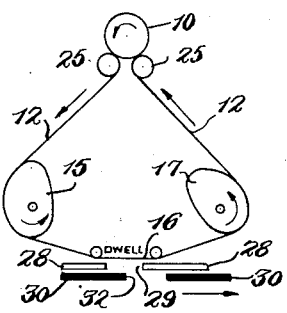
Figure 8:
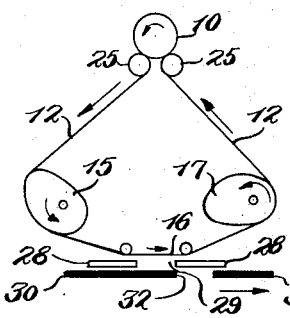

Specifically, Figure 4 shows the initial stage of the film dwell period where the framing plate aperture 29 is blanked out by the shutter 30 and completely out of registry with the shutter opening 32. This is the beginning of the dwell cycle of operation. In Figure 4, the shutter 30 has advanced to the right, in synchronism with the sprocket driven film speed, to bring a portion of its opening 32 in registry with the shield aperture 29 to initiate the film exposure cycle. Figure 6 shows complete registry of shutter opening 32 with the shield aperture 29. Figure 7 shows further advance of the shutter to diminish the registry of apertures 32 and 29, and Figure 8 shows the shutter advanced to blank out all registry between the two apertures 29 and 32.

During this sequence of operation the cams, having been so generated and being so disposed with relation to each other and the eccentric characteristics are in such predetermined angular relationship to each other that the distance between the fixed, non-shifting cam axes and their film engaging surfaces is so maintained as to retard the film in the platen area in such a manner as to stop, or retard, the actual linear film advance in the platen area. Specifically, Figures 4 to 8, inclusive, illustrate the dwell portion of a cycle of the two cams from a position where the film has minimum surface engagement with the left cam 15 and maximum engagement with the right cam 17, progressively to a point where the converse is true. During this entire sequence, the film at the sprocket is being continuously driven and the cams are holding the film loop under constant tension, but actual linear advance of the film in the platen area is completely stopped, or retarded, as desired.

During the second portion of the cycle indicated generally by Figures 9 and 10, the accumulated film on the left cam is fed across the platen area at an accelerated and higher rate than the film is moving at the sprocket. This excess accumulated film on the left cam is fed across the platen area at an accelerated and higher rate than the film is moving at the sprocket. This excess accumulated film is transferred during this "pull-down" or excess phase, from the left cam 15 to the right, and the cycle begins again.

Since the cams can be designed to touch only the edges of the format in 16 mm. and 35 mm. film, and since a relatively large number of teeth can be in contact with the sprocket on both the film supply and take-up sides, there is a minimum of wear on the film. In actual practice, I have run the same roll of 16 mm. film more than thirty times through this mechanism at 400 frames per second without damage to the perforation or to the splice.

Linear variations in the film due to temperature, humidity and the like, may be accommodated in the system by appropriately adjusting one or more idlers so as to lengthen or decrease the size of the fixed loop. Framing may be accomplished by moving the idlers relative to the sprocket so as to shift the relative position of the loop with respect to the framing plate.

An important advantage to be gained through use of this intermittent movement in viewers, and the like, is that it is equally in balance and in proper working sequence with the film traveling in either direction.

For other applications, the cams may be so shaped that their basic take-up rate is less than the film feed velocity. The cams may also be shaped to obtain any desired velocity distribution or acceleration characteristics. If the cam take-up rate is greater than the film feed velocity, the film will move in a reverse direction in the platen area.

In addition to the flexibility and broad adaptability of this approach, it is further possible to dynamically balance all driving members so that high framing rates may be achieved without danger to the mechanism. In my device, with dynamic balance, the only mass that experiences acceleration during each cycle is that small weight of film between the two cams in the platen area. This device therefore can be operated with less power than that required by conventional intermittent devices.

Figure 11 is similar to Figure 4 but in Figure 11 I have substituted a pair of non-circular symmetric elliptical cams 15' and 17' for the asymmetric cams 15 and 17 of Figure 4. These particular elliptical cams 15' and 17' are merely representative of various forms that symmetric cams may take in accordance with my invention. It is also to be understood that I may also employ asymmetric cams of various surface contours other than the specific type shown in Figure 4.

With this in mind the important consideration is that one or more cams are mounted to be disposed on each side of a predetermined area, which in photographic apparatus would be the platen area. These cams, in accordance with my invention, must be non-circular in surface contour and be mounted on axes that do not shift during the rotation of the cams. Moreover, the cams are assembled in my device in such a manner that their non-circular eccentric or profile characteristics are in such predetermined angular relationship to each other that the distance between the fixed non-shifting cam axes and the surfaces that are engaged by the strip is so maintained as to control the movement of the strip in the area between the spaced cams, during a large portion of a revolution of the cams, so that there is virtually no linear advance of the strip, despite the fact that it continues to be driven by a strip driving means. During the remainder of the revolution of the cams the strip is accelerated to be linearly advanced at a speed in excess of the speed of operation of the strip driving means.

As previously stated, my cam control means embraces a control mechanism for intermittently advancing predetermined lengths of a strip of material whether it be wire, thread, tape, paper or exposed or unexposed photographic film and the like, and for interrupting the advance of the strip for a predetermined time interval without interrupting the operation of the positive strip driving mechanism or its driving force upon the strip. Therefore, the term "strip," as may appear in the appended claims, is intended to be generic in the above sense.

I claim:

1. In an apparatus for intermittently advancing and retarding the advance of a strip, a rotatable driving member for positively engaging said strip to drive the strip, a pair of cams spaced with respect to the direction of travel of said strip, each cam having a non-circular outer surface and each cam being mounted to rotate on an independent fixed non-shifting axis parallel to each other and to the axis of rotation of said strip driving member, means for rotating said cams in synchronism with said strip driving member, portions of the surfaces of said cams being adapted to directly contact a portion of said strip between spaced points of engagement of the strip with said driving member to position a shifting section of said strip between said cams, said cams constituting the sole means for regulating and controlling the predetermined actual advancing and retarding the advance of the strip between said cams as said driving member continues to drive said strip and said cams being so arranged with their eccentric characteristics in such predetermined angular relationship to each other that during one cycle of operation, involving a partial revolution of said cams, the distance between the cam axes and the strip engaging surfaces is so maintained as to move the portion of the strip engaging said cams in such a manner as to retard the actual advance of the strip between the cams, while the strip is being driven continuously by said driving member, and so that during a followed second cycle, involving the remainder of revolution of the cams, the distance between the cam axes and their strip engaging surfaces is so varied as to accelerate the actual movement of the strip between the cams.

2. In an apparatus for intermittently advancing and retarding the advance of a strip, a rotatable driving member for positively engaging said strip to drive the strip, a pair of cams spaced with respect to the direction of travel of said strip, each cam having a non-circular outer surface and each mounted to rotate on an independent fixed non-shifting axis parallel to each other and to the axis of rotation of said strip driving member, means for rotating said cams in synchronism with said strip driving member, portions of the surfaces of said cams being adapted to directly contact a portion of said strip between spaced points of engagement of the strip with said driving member to maintain the loop taut under constant tension and to position a shifting section of said strip between said cams, said cams being so arranged with their eccentric characteristics in such predetermined angular relationship to each other that during one cycle of operation involving a portion of a revolution of said cams, the strip engages the maximum surface of one cam and the minimum surface of the other cam, which surface engagement shifts during said cycle to the converse so as to retard the actual advance of the strip between the cams while the strip is being driven continuously by said driving member, and so that during a following second cycle involving the remaining portion of a revolution of said cams, the strip simultaneously engages maximum surfaces of said cams to accelerate the actual movement of the strip between the cams.

3. In an apparatus for intermittently advancing and retarding the advance of a strip, a rotatable driving member for positively engaging said strip to drive the strip, a pair of cams spaced with respect to the direction of travel of said strip, each cam having a non-circular surface and each cam being mounted to rotate on an independent fixed non-shifting axis parallel to each other and to the axis of rotation of said strip driving member, means for rotating said cams in the same direction as said strip driving member and in synchronism therewith, portions of the outer surfaces of said cams being adapted to directly contact a portion of said strip between spaced points of engagement of the strip with said driving member to maintain the loop taut under constant tension and to position a shifting section of said strip between said cams, said cams, in conjunction with said driving member, constituting the sole means for regulating and controlling the predetermined actual advancing and retarding the advance of the strip between said cams as said driving member continuously drives said strip, in that said cams are so arranged with their eccentric characteristics in such predetermined angular relationship to each other that during one cycle of operation, involving a partial revolution of said cams, the distance between the cam axes and the strip engaging surfaces is so maintained as to move the portion of the strip engaging said cams in such a manner as to retard the actual advance of the strip between the cams, while the strip is being continuously driven by said driving member, and so that during a following second cycle, involving the remaining portion of a revolution of the cams, the distance between the cam axes and their strip engaging surfaces is so varied as to accelerate the actual movement of the strip between the cams.

4. In an apparatus for intermittently advancing and retarding the advance of a strip, a constant speed rotatable driving member for positively engaging said strip to drive the strip, a pair of cams spaced with respect to the direction of travel of said strip, each cam having a non-circular surface and each cam being mounted to rotate on an independent fixed non-shifting axis parallel to each other and to the axis of rotation of said strip driving member, means for rotating said cams in the same direction as said strip driving member and in synchronism therewith, portions of the outer surfaces of said cams being adapted to directly contact a portion of said strip between spaced points of engagement of the strip with said driving member to maintain the loop taut under constant tension and to position a shifting section of said strip between said cams, said cams, in conjunction with said driving member, constituting the sole means for regulating and controlling the predetermined actual advancing and retarding the advance of the strip between said cams as said driving member continuously drives said strip, in that said cams are so arranged with their eccentric characteristics in such predetermined angular relationship to each other that during one cycle of operation involving approximately one-half of a revolution of said cams, the strip engages the maximum surface of one cam and the minimum surface of the other cam, which surface engagement shifts during said cycle to the converse so as to retard the actual advance of the strip between the cams while the strip is being continuously driven by said driving member, and so that during a following second cycle involving the remaining approximate one-half revolution of said cams, the strip simultaneously engages maximum surfaces of said cams to accelerate the actual movement of the strip between the cams.

5. A photographic apparatus having a platen and a moving shutter adjacent the platen area, means for intermittently advancing and retarding the advance of a photographic film across the platen area, a rotatable driving member for positively engaging said film to drive the film, a pair of cams spaced with respect to the direction of travel of said strip, each cam having a non-circular surface and each cam being mounted to rotate on an independent fixed non-shifting axis parallel to each other and to the axis of rotation of said film driving member, means for rotating said cams in synchronism with said strip driving member, portions of the outer surfaces of said cams being adapted to directly contact a portion of said film between spaced points of engagement of the film with said driving member to maintain the film taut under constant tension and to position a shifting section of said film between said cams, said cams being so arranged with their eccentric characteristics in such predetermined angular relationship to each other that during one cycle of operation, involving a partial revolution of said cams, the distance between the cam axes and the film engaging surfaces is so maintained as to move the portion of the film engaging said cams in such a manner as to retard the actual advance of the film between the cams and across the platen area while the film is being driven continuously by said driving member, and so that during a following second cycle, involving the remainder of the revolution of the cams, the distance between the cam axes and their film engaging surfaces is so varied as to accelerate the actual movement of the film between the cams.

6. In a photographic apparatus having a platen and a moving shutter adjacent the platen area, means for intermittently advancing and retarding the advance of a photographic film across the platen area, a rotatable driving member for positively engaging said film to drive the film, a pair of cams spaced with respect to the direction of travel of said strip, each cam having a non-circular surface and each cam being mounted to rotate on an independent fixed non-shifting axis parallel to each other and to the axis of rotation of said film driving member, means for rotating said cams in the same direction as said film driving member and in synchronism therewith, portions of the outside surfaces of said cams being adapted to directly contact a portion of said strip between spaced points of engagement of the film with said driving member to maintain the film loop taut under constant tension and to position a shifting section of said film between said cams, said cams being so arranged with their eccentric characteristics in such predetermined angular relationship to each other that during one cycle of operation involving approximately one-half of a revolution of said cams, the film engages the maximum surface of one cam and the minimum surface of the other cam, which surface engagement shifts during said cycle to the converse so as to retard the actual advance of the film between the cams and across the platen area while the film is being driven continuously by said driving member, and so that during a following second cycle involving the remaining approximate one-half revolution of said cams, the film simultaneously engages maximum surfaces of said cams to accelerate the actual movement of the film between the cams.

7. In a photographic apparatus having a platen and a moving shutter adjacent the platen area, means for intermittently advancing and retarding the advance of a photographic film across the platen area, a rotatable driving member for positively engaging said film to drive the film, a pair of cams spaced with respect to the direction of travel of said strip, each cam having a noncircular surface, each cam being mounted to rotate on an independent fixed non-shifting axis parallel to each other and to the axis of rotation of said film driving member, means for rotating said cams in synchronism with said strip driving member, portions of the outer surfaces of said cams being adapted to directly contact a portion of said film between spaced points of engagement of the film with said driving member to maintain the film taut under constant tension and to position a shifting section of said film between said cams, said cams, in conjunction with said driving member, constituting the sole means for regulating and controlling the predetermined actual advancing and retarding the advance of the film between said cams as said driving member continuously drives said film, in that said cams are so arranged with their eccentric characteristics in such predetermined angular relationship to each other that during one cycle of operation, involving a partial revolution of said cams, the distance between the cam axes and the film engaging surfaces is so maintained as to move the portion of the film engaging said cams in such a manner as to retard the actual advance of the film between the cams and across the platen area while the film is being driven continuously by said driving member, and so that during a following second cycle, involving the remainder of revolution of the cams, the distance between the cam axes and their film engaging surfaces is so varied as to accelerate the actual movement of the film between the cams.

8. In a photographic apparatus having a platen and a moving shutter adjacent the platen area, means for intermittently advancing and retarding the advance of a photographic film, a rotatable driving member for positively engaging said film to drive the film, a pair of cams spaced with respect to the direction of travel of said strip, each cam having a non-circular surface and each cam being mounted to rotate on an independent fixed non-shifting axis parallel to each other and to the axis of rotation of said film driving member, means for rotating said cams in the same direction as said film driving member and in synchronism therewith, portions of the outer surfaces of said cams being adapted to directly contact a portion of said film between spaced points of engagement of the film with said driving member to maintain the film loop taut under constant tension and to position a shifting section of said film between said cams, said cams, in conjunction with said driving member, constituting the sole means for regulating and controlling the predetermined actual advancing and retarding the advance of the film between said cams as said driving member continuously drives said film, in that said cams are so arranged with their eccentric characteristics in such predetermined angular relationship to each other that during one cycle of operation involving approximately one-half of a revolution of said cams, the film engages the maximum surface of one cam and the minimum surface of the other cam, which surface engagement shifts during said cycle to the converse so as to retard the actual advance of the film between the cams and across the platen area while the film is being driven continuously by said driving member, and so that during a following second cycle involving the remaining approximate one-half revolution of said cams, the film simultaneously engages maximum surfaces of said cams to accelerate the actual movement of the film between the cams.

References Cited in the file of this patent

UNITED STATES PATENTS 620,357    Prestwich  -------------- Feb. 28, 1899